US009806994B2

United States Patent
Haramaty et al.

(10) Patent No.: US 9,806,994 B2
(45) Date of Patent: Oct. 31, 2017

(54) ROUTING VIA MULTIPLE PATHS WITH EFFICIENT TRAFFIC DISTRIBUTION

(71) Applicant: MELLANOX TECHNOLOGIES LTD., Yokneam (IL)

(72) Inventors: Zachy Haramaty, Hemed (IL); Aviv Kfir, Nili (IL); Benny Koren, Zichron Yaakov (IL); Barak Gafni, Ramat Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 157 days.

(21) Appl. No.: 14/732,853

(22) Filed: Jun. 8, 2015

(65) Prior Publication Data

US 2015/0372916 A1    Dec. 24, 2015

Related U.S. Application Data

(60) Provisional application No. 62/016,141, filed on Jun. 24, 2014.

(51) Int. Cl.
  *H04L 12/743*  (2013.01)
  *H04L 12/707*  (2013.01)

(52) U.S. Cl.
  CPC .................................. *H04L 45/24* (2013.01)

(58) Field of Classification Search
  None
  See application file for complete search history.

(56) References Cited

U.S. PATENT DOCUMENTS

| 4,312,064 A | 1/1982 | Bench et al. |
| 6,115,385 A | 9/2000 | Vig |
| 6,169,741 B1 | 1/2001 | LeMaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |

(Continued)

FOREIGN PATENT DOCUMENTS

WO    2016105446 A1    6/2016

OTHER PUBLICATIONS

U.S. Appl. No. 14/662,259 Office Action dated Sep. 22, 2016.
(Continued)

*Primary Examiner* — Charles C Jiang
*Assistant Examiner* — Rose Clark
(74) *Attorney, Agent, or Firm* — D. Kligler IP Services Ltd.

(57) ABSTRACT

A network element includes circuitry and one or more interfaces. The interfaces are configured to connect to a communication network. The circuitry is configured to assign multiple egress interfaces corresponding to respective different paths via the communication network for routing packets to a given destination-address group, to hold, for the given destination-address group, respective state information for each of multiple sets of hash results, to receive via an ingress interface a packet destined to the given destination-address group, to calculate a given hash result for the packet and identify a given set of hash results in which the given hash result falls, and to forward the packet via one of the multiple egress interfaces in accordance with the state information corresponding to the given destination-address group and the given set of hash results.

18 Claims, 3 Drawing Sheets

(56) References Cited

U.S. PATENT DOCUMENTS

| | | | |
|---|---|---|---|
| 6,665,297 B1* | 12/2003 | Hariguchi | H04L 45/00 370/392 |
| 6,775,268 B1 | 8/2004 | Wang et al. | |
| 6,804,532 B1 | 10/2004 | Moon et al. | |
| 6,831,918 B1 | 12/2004 | Kavak | |
| 6,912,604 B1 | 6/2005 | Tzeng et al. | |
| 6,950,428 B1 | 9/2005 | Horst et al. | |
| 7,010,607 B1 | 3/2006 | Bunton | |
| 7,076,569 B1 | 7/2006 | Bailey et al. | |
| 7,234,001 B2 | 6/2007 | Simpson et al. | |
| 7,286,535 B2 | 10/2007 | Ishikawa et al. | |
| 7,676,597 B2 | 3/2010 | Kagan et al. | |
| 7,746,854 B2 | 6/2010 | Ambe et al. | |
| 7,936,770 B1 | 5/2011 | Frattura et al. | |
| 7,969,980 B1 | 6/2011 | Florit et al. | |
| 8,094,569 B2 | 1/2012 | Gunukula et al. | |
| 8,175,094 B2 | 5/2012 | Bauchot et al. | |
| 8,195,989 B1 | 6/2012 | Lu et al. | |
| 8,401,012 B2 | 3/2013 | Underwood et al. | |
| 8,489,718 B1 | 7/2013 | Brar et al. | |
| 8,495,194 B1 | 7/2013 | Brar et al. | |
| 8,576,715 B2 | 11/2013 | Bloch et al. | |
| 8,605,575 B2 | 12/2013 | Gunukula et al. | |
| 8,621,111 B2 | 12/2013 | Marr et al. | |
| 8,755,389 B1* | 6/2014 | Poutievski | H04L 45/245 370/395.31 |
| 8,774,063 B2 | 7/2014 | Beecroft | |
| 8,873,567 B1 | 10/2014 | Mandal et al. | |
| 8,908,704 B2 | 12/2014 | Koren et al. | |
| 9,014,006 B2 | 4/2015 | Haramaty et al. | |
| 9,042,234 B1 | 5/2015 | Liljenstolpe et al. | |
| 9,571,400 B1 | 2/2017 | Mandal et al. | |
| 2002/0013844 A1 | 1/2002 | Garrett et al. | |
| 2002/0026525 A1 | 2/2002 | Armitage | |
| 2002/0039357 A1 | 4/2002 | Lipasti et al. | |
| 2002/0071439 A1 | 6/2002 | Reeves et al. | |
| 2002/0136163 A1 | 9/2002 | Kawakami et al. | |
| 2002/0138645 A1 | 9/2002 | Shinomiya et al. | |
| 2002/0165897 A1 | 11/2002 | Kagan et al. | |
| 2003/0016624 A1 | 1/2003 | Bare | |
| 2003/0039260 A1 | 2/2003 | Fujisawa | |
| 2003/0065856 A1 | 4/2003 | Kagan et al. | |
| 2003/0079005 A1 | 4/2003 | Myers et al. | |
| 2003/0223453 A1 | 12/2003 | Stoler et al. | |
| 2004/0111651 A1 | 6/2004 | Mukherjee et al. | |
| 2004/0202473 A1 | 10/2004 | Nakamura et al. | |
| 2005/0013245 A1 | 1/2005 | Sreemanthula et al. | |
| 2005/0157641 A1 | 7/2005 | Roy | |
| 2005/0259588 A1 | 11/2005 | Preguica | |
| 2006/0126627 A1 | 6/2006 | Diouf | |
| 2006/0182034 A1 | 8/2006 | Klinker et al. | |
| 2006/0291480 A1 | 12/2006 | Cho et al. | |
| 2007/0058536 A1 | 3/2007 | Vaananen et al. | |
| 2007/0058646 A1 | 3/2007 | Hermoni | |
| 2007/0070998 A1 | 3/2007 | Sethuram et al. | |
| 2007/0091911 A1 | 4/2007 | Watanabe et al. | |
| 2007/0223470 A1 | 9/2007 | Stahl | |
| 2007/0237083 A9 | 10/2007 | Oh et al. | |
| 2008/0002690 A1 | 1/2008 | Ver Steeg et al. | |
| 2008/0112413 A1* | 5/2008 | Pong | H04L 45/00 370/392 |
| 2008/0165797 A1 | 7/2008 | Aceves | |
| 2008/0189432 A1 | 8/2008 | Abali et al. | |
| 2008/0267078 A1 | 10/2008 | Farinacci et al. | |
| 2008/0298248 A1 | 12/2008 | Roeck et al. | |
| 2009/0103534 A1 | 4/2009 | Malledant et al. | |
| 2009/0119565 A1 | 5/2009 | Park et al. | |
| 2010/0039959 A1 | 2/2010 | Gilmartin | |
| 2010/0049942 A1 | 2/2010 | Kim et al. | |
| 2010/0111529 A1 | 5/2010 | Zeng et al. | |
| 2010/0141428 A1 | 6/2010 | Mildenberger et al. | |
| 2010/0216444 A1 | 8/2010 | Mariniello et al. | |
| 2010/0284404 A1 | 11/2010 | Gopinath et al. | |
| 2010/0290385 A1 | 11/2010 | Ankaiah et al. | |
| 2010/0315958 A1 | 12/2010 | Luo et al. | |
| 2011/0019673 A1 | 1/2011 | Fernandez Gutierrez | |
| 2011/0085440 A1 | 4/2011 | Owens et al. | |
| 2011/0085449 A1 | 4/2011 | Jeyachandran et al. | |
| 2011/0164496 A1 | 7/2011 | Loh et al. | |
| 2011/0225391 A1* | 9/2011 | Burroughs | G06F 9/3851 711/216 |
| 2011/0249679 A1 | 10/2011 | Lin et al. | |
| 2011/0255410 A1 | 10/2011 | Yamen et al. | |
| 2011/0265006 A1 | 10/2011 | Morimura et al. | |
| 2011/0299529 A1 | 12/2011 | Olsson et al. | |
| 2012/0020207 A1 | 1/2012 | Corti et al. | |
| 2012/0082057 A1 | 4/2012 | Welin et al. | |
| 2012/0144064 A1 | 6/2012 | Parker et al. | |
| 2012/0144065 A1 | 6/2012 | Parker et al. | |
| 2012/0147752 A1 | 6/2012 | Ashwood-Smith et al. | |
| 2012/0163797 A1 | 6/2012 | Wang | |
| 2012/0207175 A1* | 8/2012 | Raman | H04L 47/125 370/412 |
| 2012/0300669 A1 | 11/2012 | Zahavi | |
| 2012/0314706 A1 | 12/2012 | Liss | |
| 2013/0044636 A1* | 2/2013 | Koponen | H04L 47/12 370/254 |
| 2013/0071116 A1 | 3/2013 | Ong | |
| 2013/0083701 A1 | 4/2013 | Tomic et al. | |
| 2013/0114599 A1 | 5/2013 | Arad | |
| 2013/0114619 A1 | 5/2013 | Wakumoto | |
| 2013/0170451 A1 | 7/2013 | Krause et al. | |
| 2013/0208720 A1 | 8/2013 | Ellis et al. | |
| 2013/0242745 A1 | 9/2013 | Umezuki | |
| 2013/0301646 A1 | 11/2013 | Bogdanski et al. | |
| 2013/0315237 A1 | 11/2013 | Kagan et al. | |
| 2013/0322256 A1 | 12/2013 | Bader et al. | |
| 2013/0336116 A1 | 12/2013 | Vasseur et al. | |
| 2014/0043959 A1 | 2/2014 | Owens et al. | |
| 2014/0140341 A1 | 5/2014 | Bataineh et al. | |
| 2014/0192646 A1 | 7/2014 | Mir et al. | |
| 2014/0313880 A1 | 10/2014 | Lu et al. | |
| 2014/0328180 A1* | 11/2014 | Kim | H04L 47/21 370/235.1 |
| 2014/0343967 A1 | 11/2014 | Baker | |
| 2015/0030033 A1 | 1/2015 | Vasseur et al. | |
| 2015/0052252 A1 | 2/2015 | Gilde et al. | |
| 2015/0092539 A1 | 4/2015 | Sivabalan et al. | |
| 2015/0098466 A1 | 4/2015 | Haramaty et al. | |
| 2015/0124815 A1* | 5/2015 | Beliveau | H04L 45/7453 370/392 |
| 2015/0163144 A1 | 6/2015 | Koponen et al. | |
| 2015/0194215 A1* | 7/2015 | Douglas | G11C 15/04 711/108 |
| 2016/0014636 A1 | 1/2016 | Bahr et al. | |
| 2016/0080120 A1 | 3/2016 | Unger et al. | |
| 2016/0182378 A1* | 6/2016 | Basavaraja | H04L 45/745 370/235 |

OTHER PUBLICATIONS

Afek et al., "Sampling and Large Flow Detection in SDN", SIGCOMM '15, pp. 345-346, Aug. 17-21, 2015, London, UK.

U.S. Appl. No. 14/745,488 Office Action dated Dec. 6, 2016.

U.S. Appl. No. 14/337,334 Office Action dated Oct. 20, 2016.

Dally et al., "Deadlock-Free Message Routing in Multiprocessor Interconnection Networks", IEEE Transactions on Computers, vol. C-36, No. 5, May 1987, pp. 547-553.

Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.

Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.

"Equal-cost multi-path routing", Wikipedia, 2 pages, Oct. 13, 2014.

Thaler et al., "Multipath Issues in Unicast and Multicast Next-Hop Selection", Network Working Group, RFC 2991, 9 pages, Nov. 2000.

(56) References Cited

OTHER PUBLICATIONS

Nkposong et al., "Experiences with BGP in Large Scale Data Centers:Teaching an old protocol new tricks", 44 pages, Jan. 31, 3014.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.
Nowlab—Network Based Computing Lab, 2 pages, years 2002-2015 http://nowlab.cse.ohio-state.edu/publications/conf-presentations/2007/vishnu-ccgrid07.pdf.
Alizadeh et al., "CONGA: Distributed Congestion-Aware Load Balancing for Datacenters", Cisco Systems, 12 pages, Aug. 9, 2014.
Geoffray et al., "Adaptive Routing Strategies for Modern High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Glass et al., "The turn model for adaptive routing", Journal of the ACM, vol. 41, No. 5, pp. 874-903, Sep. 1994.
Leiserson, C E., "Fat-Trees: Universal Networks for Hardware Efficient Supercomputing", IEEE Transactions on Computers, vol. C-34, No. 10, pp. 892-901, Oct. 1985.
Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.
Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on Architecture Computer, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, Nov. 2006.
Infiniband Trade Association, "InfiniBandTM Architecture Specification vol. 1", Release 1.2.1, Nov. 2007.
Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
Martinez et al., "Supporting fully adaptive routing in Infiniband networks", Proceedings of the International Parallel and Distributed Processing Symposium (IPDPS'03), Nice, France, 10 pages, Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.
Ding et al., "Level-wise scheduling algorithm for fat tree interconnection networks", Proceedings of the 2006 ACM/IEEE Conference on Supercomputing (SC 2006), 9 pages, Nov. 2006.
U.S. Appl. No. 14/046,976 Office Action dated Jun. 2, 2015.
Li et al., "Multicast Replication Using Dual Lookups in Large Packet-Based Switches", 2006 IET International Conference on Wireless, Mobile and Multimedia Networks, , pp. 1-3, Nov. 6-9, 2006.
Nichols et al., "Definition of the Differentiated Services Field (DS Field) in the IPv4 and IPv6 Headers", Network Working Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
U.S. Appl. No. 12/910,900 Office Action dated Apr. 9, 2013.
Haramaty et al., U.S. Appl. No. 14/745,488, filed Jun. 22, 2015.
U.S. Appl. No. 14/046,976 Office Action dated Jan. 14, 2016.
U.S. Appl. No. 14/970,608 Office Action dated May 30, 2017.
U.S. Appl. No. 14/673,892 Office Action dated Jun. 1, 2017.

\* cited by examiner

ROUTING VIA MULTIPLE PATHS WITH EFFICIENT TRAFFIC DISTRIBUTION

CROSS-REFERENCE TO RELATED APPLICATIONS

This application claims the benefit of U.S. Provisional Patent Application 62/016,141, filed Jun. 24, 2014, whose disclosure is incorporated herein by reference.

FIELD OF THE INVENTION

The present invention relates generally to communication networks, and particularly to methods and systems for routing over multiple paths.

BACKGROUND OF THE INVENTION

Various communication systems support traffic delivery to a given destination over multiple paths. When configured with multiple paths, a network router or switch typically selects one of the paths for each incoming packet. Multiple paths are used for example in adaptive routing (AR), in which packets may be re-routed based on the network state.

Methods for multi-path routing in various network topologies are known in the art. For example, U.S. Pat. No. 8,576,715, whose disclosure is incorporated herein by reference, describes a method for communication that includes routing a first packet, which belongs to a given packet flow, over a first routing path through a communication network. A second packet, which follows the first packet in the given packet flow, is routed using a time-bounded Adaptive Routing (AR) mode, by evaluating a time gap between the first and second packets, routing the second packet over the first routing path if the time gap does not exceed a predefined threshold, and, if the time gap exceeds the predefined threshold, selecting a second routing path through the communication network that is potentially different from the first routing path, and routing the second packet over the second routing path.

U.S. Patent Application Publication 2012/0144064, whose disclosure is incorporated herein by reference, describes a dragonfly processor interconnect network that comprises a plurality of processor nodes and a plurality of routers. The routers are operable to adaptively route data by selecting from among a plurality of network paths from a target node to a destination node in the dragonfly network, based on network congestion information from neighboring routers and failed network link information from neighboring routers.

As another example, U.S. Patent Application Publication 2012/0144065, whose disclosure is incorporated herein by reference describes a dragonfly processor interconnect network that comprises a plurality of processor nodes and a plurality of routers. The routers are operable to route data by selecting from among a plurality of network paths from a target node to a destination node in the dragonfly network based on one or more routing tables.

SUMMARY OF THE INVENTION

An embodiment of the present invention provides a network element that includes one or more interfaces and circuitry. The interfaces are configured to connect to a communication network. The circuitry is configured to assign multiple egress interfaces corresponding to respective different paths via the communication network for routing packets to a given destination-address group, to hold, for the given destination-address group, respective state information for each of multiple sets of hash results, to receive via an ingress interface a packet destined to the given destination-address group, to calculate a given hash result for the packet and identify a given set of hash results in which the given hash result falls, and to forward the packet via one of the multiple egress interfaces in accordance with the state information corresponding to the given destination-address group and the given set of hash results.

In some embodiments, the circuitry is configured to hold the state information per set of hash results in multiple hash tables that correspond to multiple respective destination-address groups, to identify the given destination-address group to which the packet is destined, to select a hash table corresponding to the given destination-address group, and to retrieve the state information from the selected hash table. In other embodiments, the circuitry is configured to hold a mapping between the destination-address groups and the respective hash tables, and to select the hash table by matching a destination address of the packet to the given destination-address group and choosing the hash table based on the given destination-address group using the mapping.

In yet other embodiments, the circuitry is configured to match the destination address by identifying that the destination address belongs to the given destination-address group. In yet further other embodiments, the state information includes at least an egress interface selected from among the assigned egress interfaces, and timeout information.

In an embodiment, the circuitry is configured to assign the multiple egress interfaces to be used in equal-cost multi-path (ECMP) routing. In another embodiment, the circuitry is configured to assign the multiple egress interfaces to be used in adaptive routing (AR). In yet another embodiment, the circuitry is configured to assign the multiple egress interfaces to be used in the OpenFlow protocol. In yet further another embodiment, the circuitry is configured to assign the multiple egress interfaces to be used in link aggregation (LAG).

There is additionally provided, in accordance with an embodiment of the present invention, a method including assigning in a network element multiple egress interfaces corresponding to respective different paths via a communication network for routing packets to a given destination-address group. For the given destination-address group, respective state information is held for each of multiple sets of hash results. A packet destined to the given destination-address group is received via an ingress port. A given hash result is calculated for the packet and a set of hash results in which the given hash result falls is identified. The packet is forwarded via one of the assigned egress interfaces in accordance with the state information corresponding to the given destination-address group and the given set of hash results.

The present invention will be more fully understood from the following detailed description of the embodiments thereof, taken together with the drawings in which:

DETAILED DESCRIPTION OF EMBODIMENTS

Overview

Figure 1:
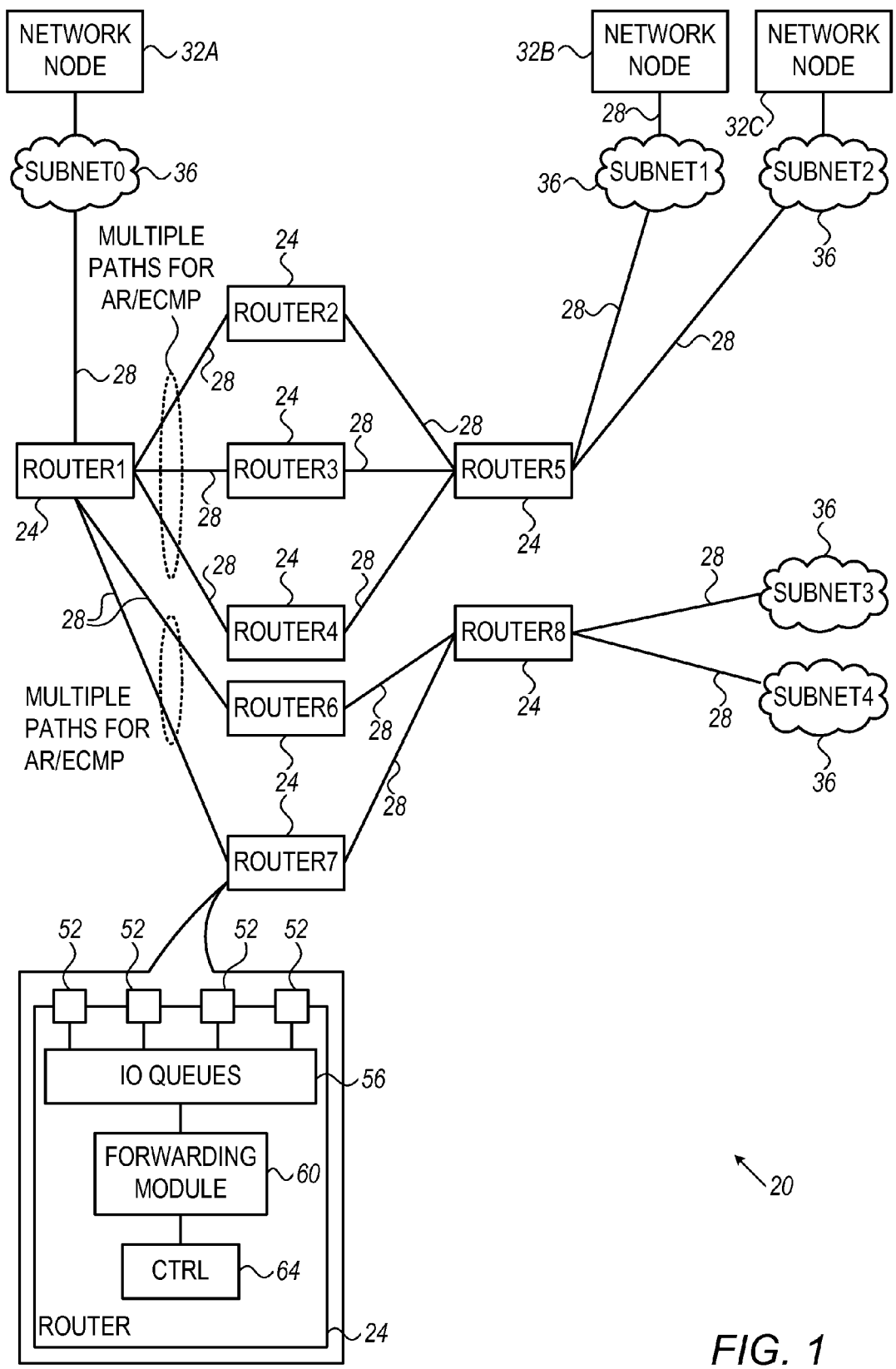
FIG. 1 is a block diagram that schematically illustrates a communication network that supports routing traffic to a destination over multiple paths, in accordance with an embodiment that is described herein.

Multi-path routing refers to sending traffic to a destination via a communication network over multiple different paths. Consider, for example, a router that configures a group of multiple egress interfaces to support multi-path routing to a given destination, e.g., at initialization. When the router receives a packet that is addressed to this destination, the router forwards the packet via one of the egress interfaces that were assigned to multi-path routing.

In principle, the router can forward all the packets addressed to the same destination via the same egress interface, and re-route all these packets to an alternative egress interface, e.g., upon congestion. This routing scheme, however, may result in non-uniform traffic distribution and possibly overload the alternative egress interface.

Embodiments of the present disclosure that are described herein provide improved methods and systems for multi-path routing with efficient traffic distribution.

A large network is sometimes divided into smaller sub-networks that are each assigned a dedicated group of destination addresses. Thus, to route a packet to a given destination, a router should typically match the destination address of the packet to the destination address-group of the relevant subnetwork and forward the packet accordingly.

In some embodiments, to distribute packets that belong to different flows among the egress interfaces assigned to multi-path routing, the router calculates a hash function over certain fields in the packet headers, e.g., fields that identify the flow, and uses the hash result to choose an egress interface for the packet. In some embodiments, at least some of the possible outcomes of the hash function are arranged in groups that are referred to herein as hash-sets. A hash-set may comprise one or more outcomes of the hash function, and the hash result calculated over the packet typically belongs to a single hash-set. Hash-sets are sometimes referred to as "buckets".

In some embodiments, the router holds respective state information for each of multiple pairs of destination-address-group value and hash-set. The state information comprises a selected egress interface and possibly other information such as a timeout counter. For routing a packet, the router finds a destination-address group to which the destination address of the packet belongs, and a hash-set in which the hash result of the packet falls, and forwards the packet in accordance with the respective state information.

In some embodiments, the data structure in which the router holds the state information comprises a routing table and multiple hash tables. The routing table maps destination-address groups to respective hash tables, and each of the hash tables holds state information per hash-set. In an embodiment, the router retrieves the state information in two phases. In the first phase, the router matches the destination address of the packet to one of the destination-address groups in the routing table, and extracts from the routing table a pointer to the respective hash table. In the second phase, the router identifies, within the hash table selected in the first phase, a hash-set in which the hash result of the packet falls, and retrieves the respective state information.

In the disclosed techniques, the routing decision depends on state information that relates to both the destination address of the packet and to the flow identification, and therefore the flows are efficiently distributed among the multiple paths even when re-routed due to congestion or other failures.

System Description

FIG. 1 is a block diagram that schematically illustrates a communication network 20 that supports routing traffic to a destination over multiple paths, in accordance with an embodiment that is described herein. Network 20 comprises multiple routers 24 that interconnect using links 28. Network 20 provides communication between network nodes such as nodes 32A, 32B and 32C in the figure. Each node 32 may connect to the network via a suitable interface (not shown) such as a network interface controller (NIC) or host channel adapter (HCA).

Network 20 may comprise an IP network in accordance with version 4 or version 6 of the IP protocol. Alternatively, network 20 may comprise an InfiniBand or an Ethernet network, or any other suitable packet network. Further alternatively, network 20 may comprise any other suitable packet network, or a combination of multiple packet networks, operating in accordance with any suitable protocols and data rates.

Nodes 32 exchange flows of packets with one another over network 20. Each flow originates in a certain source node, ends in a certain destination node, and travels a certain path that traverses multiple routers and links.

The term "flow" refers to a sequence of packets, which transfer data between a pair of end nodes. A flow can be identified, for example, by one or more attributes from among: source/destination address such as IP address, higher layer source/destination identifiers such as TCP source/destination port number and higher layer protocol identifier such as TCP or UDP. Different flows may be processed differently, such as assigning per-flow quality of service level. In some cases, although not necessarily, the packets in a given flow are required to arrive at the same order they were sent. Flows can generally be defined at various granularity levels. Typically, finer-granularity flows may require the router to hold more state information such as a selected path and time bound timer per flow.

In the present example, network 20 comprises multiple subnetworks 36 (also referred to as "subnets" for brevity). Each subnetwork typically comprises routers similar to routers 24 or other network elements that route packets through the subnetwork. Subnetworks can be used for dividing a large network into smaller subnetworks that may be easier to manage. Typically, each subnetwork is assigned a dedicated group of addresses that use for routing packets within the subnetwork. For example, in IP networks, addresses that are used for accessing network nodes or other elements in a given subnetwork have identical most-significant bit-group in their IP address. The IP address is thus divided logically into two fields—a network or routing prefix, and a host identifier that identifies a specific host or network interface within the subnetwork.

A network node in one subnetwork may communicate with another network node in a different subnetwork. For example, node 32A attached to SUBNET0 may communicate with node 32B attached to SUBNET1 or with node 32C attached to SUBNET2. Node 32A can also communicate with elements in SUBNET3 and SUBNET4.

Network 20 supports communication between pairs of network nodes over multiple paths. For example, in FIG. 1, ROUTER1 can deliver packets received from SUBNET0 to SUBNET1 or SUBNET2 via ROUTER5 and one of routers ROUTER2, ROUTER3 and ROUTER4. Similarly, ROUTER1 can deliver packets received from SUBNET0 to SUBNET3 or SUBNET4 via ROUTER8 and one of routers ROUTER6 and ROUTER7.

Delivery over multiple paths can be used in various applications and related protocols. For example, each of the paths from ROUTER1 to ROUTER5, i.e., ROUTE1-ROUTE2-ROUTE5, ROUTE1-ROUTE3-ROUTE5 and ROUTE1-ROUTE4-ROUTE5 includes the same number of routers and therefore can be used in equal-cost multi-path (ECMP)routing, for example, to load-balance the traffic sent via these multiple paths. The same group of three paths can be used in other applications, such as, for example, in adaptive routing (AR), in which packets delivered through a congested path are re-routed to another path in the group. Other example applications that use multi-path routing include the OpenFlow protocol in which a controller external to the routers/switches manages their forwarding rules, and link aggregation (LAG).

Figure 2:
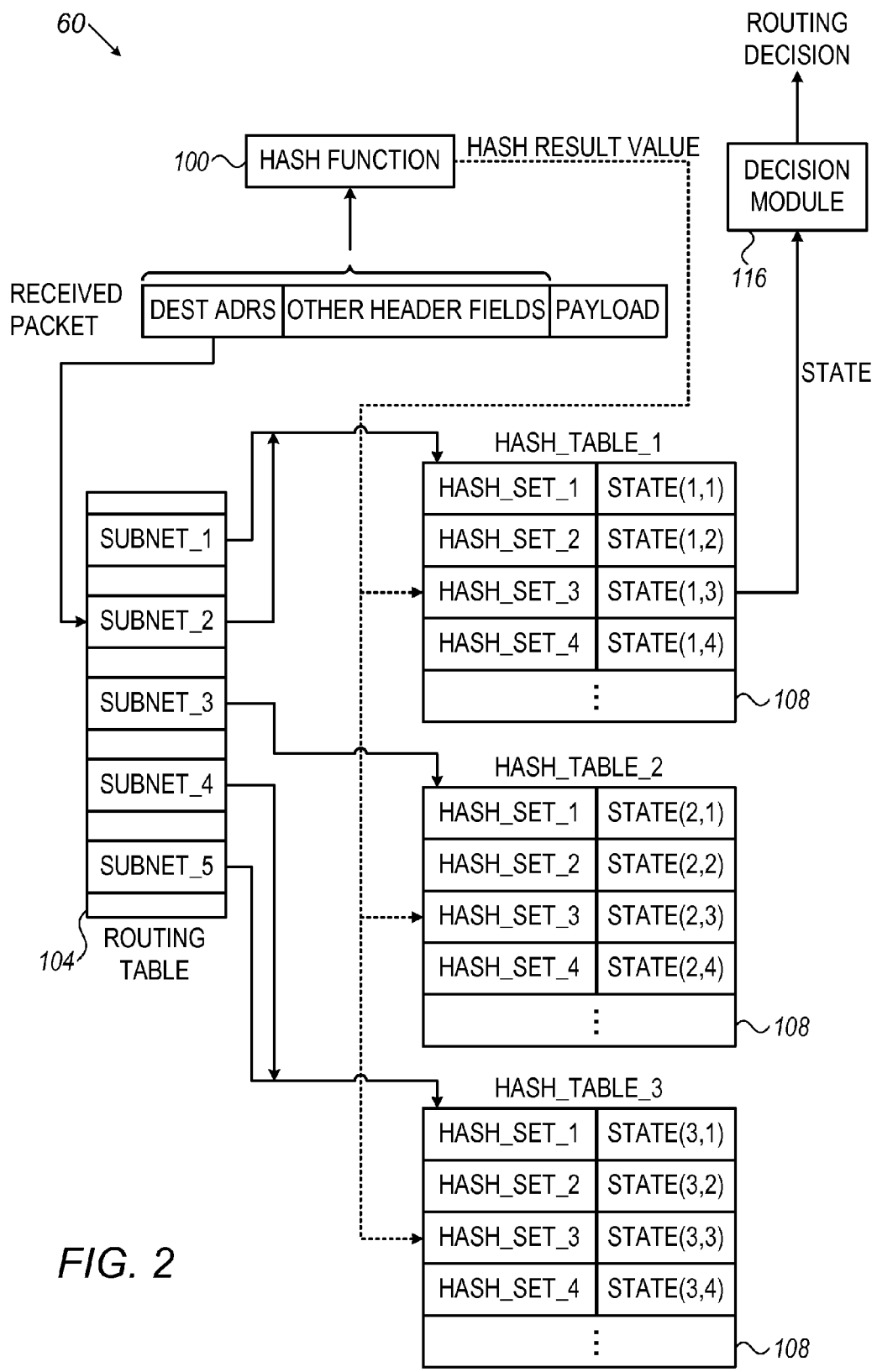
FIG. 2 is a block diagram that schematically illustrates elements of a forwarding module of a router, in accordance with an embodiment that is described herein.

In the example of FIG. 2, the two paths from ROUTER1 to ROUTER8, i.e., ROUTER1-ROUTER6-ROUTER8 and ROUTER1-ROUTER7-ROUTER8 can also be used in multi-path routing such as ECMP, AR, or in any other suitable multi-path routing scheme.

Router 24 comprises multiple ports or interfaces 52 that connect to the network. An input port or ingress interface serves for receiving packets from the network, whereas an output port or egress interface serves for transmitting packets to the network. A given ingress interface may receive packets that belong to multiple different flows. Router 24 comprises an input/output queues unit 56 that queues incoming packets and packets to be transmitted.

A forwarding module 60 comprises forwarding rules for the incoming packets. In some embodiments, the router selects an egress interface to a received packet by applying one or more respective routing rules based on certain fields in the packet headers. A control unit 64 manages the various tasks of router 24. Among other tasks, control unit 64 configures forwarding module 60 and manages the routing over multiple paths.

The forwarding rules implemented in forwarding module 60 are typically based at least on the destination address of the packet. For example, a packet should be forwarded to a given subnetwork when the destination address of the packet matches or belongs to the destination-address-group of the given subnetwork.

As will be described in detail below, in some embodiments, the router calculates a hash result over certain fields of the packet headers using a suitable hash function. In an embodiment, the possible outcomes of the hash function are divided into respective multiple sets that are referred to herein as hash-sets. A hash-set comprises one or more hash outcomes of the hash function. The router identifies a hash-set in which the hash result of the packet falls, and forwards the packet based on the destination-address group that matches the destination address of the packet, and on the hash-set.

Using this forwarding technique, different flows that are destined to the same subnetwork are distributed efficiently among the multiple paths. In addition, by calculating the same hash function over the same packet fields, in-order packet delivery per flow can be guaranteed. Moreover, different flows traversing a congested path can be re-routed to different egress interfaces, which results in efficient distribution of the traffic through the network even under congestion conditions.

The network and router configurations shown in FIG. 1 are example configurations, which are chosen purely for the sake of conceptual clarity. In alternative embodiments, any other suitable network and/or router configuration can be used. For example, although the embodiments described herein refer mainly to routers, the disclosed techniques can be implemented in various other types of network elements such as network switches.

Certain router elements may be implemented using hardware/firmware, such as using one or more Application-Specific Integrated Circuits (ASICs) or Field-Programmable Gate Arrays (FPGAs). Alternatively, some router elements may be implemented in software or using a combination of hardware/firmware and software elements.

In some embodiments, certain router functions, such as certain functions of control unit 64, may be implemented using a processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As noted above, the router comprises multiple interfaces 52 and other elements. In the description that follows and in the claims, the term "circuitry" refers to all the elements the router excluding the interfaces. In the example of FIG. 1, the circuitry comprises input/output queues 56, forwarding module 60 and control unit 64 of router 24.

Methods for Multi-Path Routing

FIG. 2 is a block diagram that schematically illustrates elements of forwarding module 60 of router 24, in accordance with an embodiment that is described herein. Forwarding module 60 selects a next-hop egress interface for an incoming packet that comprises header fields including a destination-address field and a payload field that caries data or control information.

In some embodiments, the forwarding module comprises a hash function 100, which the forwarding module applies to certain fields in the packet headers to produce a respective hash result. Forwarding module 60 may apply hash function 100 to one or more fields that identify the flow to which the packet belongs, such as one or more of the five-tuple comprising the source and destination addresses, source and destination port numbers and the underlying communication protocol. Alternatively or additionally, other suitable packet fields can also be used for calculating the hash result for the packet.

Typically, hash function 100 has multiple possible outcomes. In an embodiment, the forwarding module divides these possible outcomes into respective sets that are referred to herein as hash-sets. Each hash-set may comprise one or more hash outcomes. A given hash result typically falls within a single hash-set. As will be described below, the forwarding module makes routing decisions based on state information that is held per each of multiple pairs of destination-address-group value and hash-set.

In the example of FIG. 2, the forwarding module comprises a routing table 104 and multiple hash tables 108. Each entry of routing table 104 corresponds to a destination-address group of a respective subnetwork. The router searches table 104 to find an address-group to which the destination address of the packet belongs. For example, in IP networks, the longest prefix match algorithm (also referred to as maximum prefix length match) can be used for this purpose. Note that a given destination address may match multiple subnetworks and therefore the forwarding module typically selects the most specific of the matching table entries, i.e., the entry with the longest subnet mask or prefix match. In the example of FIG. 2, the destination address of the packet belongs to the address-group associated with SUBNET_2.

Routing table 104 maps each subnetwork or destination-address group to a respective hash table 108. Different subnetworks may correspond to the same hash table. For example, in FIG. 2, subnetworks SUBNET_1 and SUBNET_2 both correspond to HASH_TABLE_1. Similarly, SUBNET_4 and SUBNET_5 both correspond to HASH_TABLE_3.

Hash table 108 stores respective state information for each hash-set. Alternatively, a hash table may store state information for a partial subset of the hash-sets. In the example of FIG. 2, the packet hash result falls in HASH_SET_3 of HASH_TABLE_1, which results in retrieving state information STATE(1,3) from HASH_TABLE_1.

Forwarding module 60 comprises a decision module 116 that receives the retrieved state and makes a forwarding decision accordingly. The state information may comprise, for example, a selected egress interface and information used for adaptive routing such as one or more timers for timely bounded adaptive routing.

Figure 3:
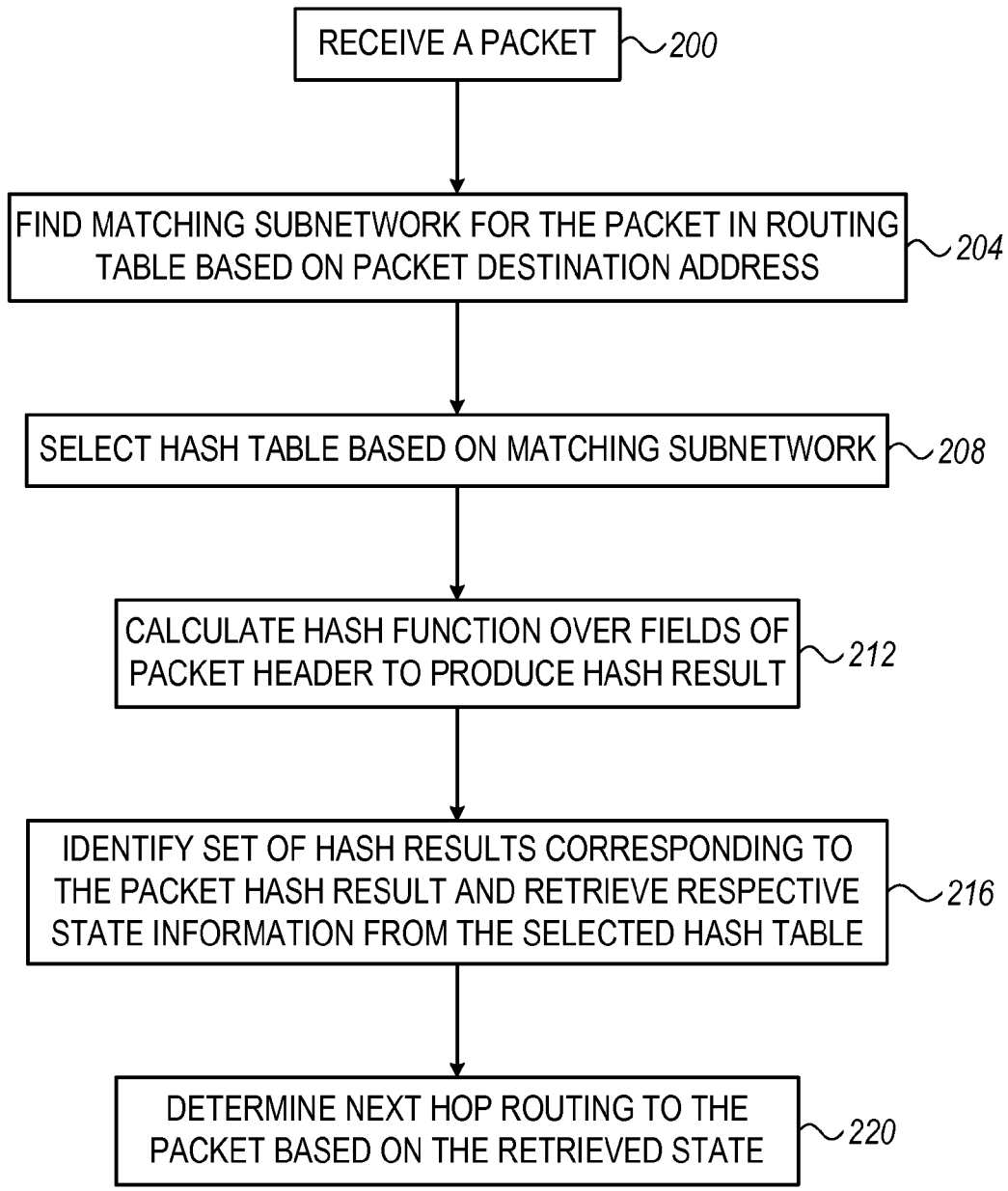
FIG. 3 is a flow chart that schematically illustrates a method for forwarding packets via multiple paths, in accordance with an embodiment that is described herein.

FIG. 3 is a flow chart that schematically illustrates a method for forwarding packets via multiple paths, in accordance with an embodiment that is described herein. At a receiving step 200, router 24 receives a packet via an ingress interface. At a matching step 204, forwarding module 60 searches routing table 104, which stores pointers to multiple respective hash tables 108, to find a subnetwork whose respective address-group includes the destination address of the received packet.

At a hash table selection step 208, forwarding module 60 uses the pointer from routing table 104 to select a respective hash table 108. The description that follows assumes that the selected hash table holds state information per hash-set, as described above.

At a hash calculation step 212, the forwarding module calculates a hash function over one or more fields in the packet headers, as described above. At a state retrieval step 216 the forwarding module finds a hash-set in which the hash result falls, and retrieves the respective state information.

At a decision step 220, decision module 116 accepts the retrieved state and decides on the next-hop egress interface for the packet based on the state. The method then terminates.

The forwarding module configuration of FIG. 2 and the forwarding method of FIG. 3 are given by way of example and in alternative embodiments other suitable forwarding module configurations and forwarding methods can also be used. For example, in some embodiments, each of hash tables 108 stores the same number of states. In other embodiments, different hash tables may store a different number of states. In some embodiments, the same hash function uses for calculating hash results for the packets, independently of the flow to which the packet belongs. In other embodiments, different hash functions can be used for different flows.

Although the data structure in FIG. 2 comprises a routing table that references multiple hash tables, this configuration is not mandatory, and in alternative embodiments other suitable data structures can also be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   multiple ports, which are configured to connect to a communication network; and
   hardware-implemented circuitry, which is configured to:
   assign multiple output ports corresponding to respective different paths via the communication network for routing packets to a given destination-address group;
   hold for the given destination-address group, respective state information for each of multiple sets of hash results, wherein the state information comprises at least an output port that routes packets to the given destination-address group and respective timeout information;
   receive via an input port a packet destined to the given destination-address group;
   calculate a given hash result for the packet and identify a given set of hash results in which the given hash result falls;
   select an output port from among the multiple output ports that were assigned to the given destination-address group, based on the state information corresponding to the identified given set of hash results; and
   forward the packet to the given destination-address group via the selected output port.

2. The network element according to claim 1, wherein the circuitry is configured to hold the state information per set of hash results in multiple hash tables that correspond to multiple respective destination-address groups, to identify the given destination-address group to which the packet is destined, to select a hash table corresponding to the given destination-address group, and to retrieve the state information from the selected hash table.

3. The network element according to claim 2, wherein the circuitry is configured to hold a mapping between the destination-address groups and the respective hash tables, and to select the hash table by matching a destination address of the packet to the given destination-address group and choosing the hash table based on the given destination-address group using the mapping.

4. The network element according to claim 3, wherein the circuitry is configured to match the destination address by identifying that the destination address belongs to the given destination-address group.

5. The network element according to claim 1, wherein the circuitry is configured to assign the multiple output ports to be used in equal-cost multi-path (ECMP) routing.

6. The network element according to claim 1, wherein the circuitry is configured to assign the multiple output ports to be used in adaptive routing (AR).

7. The network element according to claim 1, wherein the circuitry is configured to assign the multiple output ports to be used in the OpenFlow protocol.

8. The network element according to claim 1, wherein the circuitry is configured to assign the multiple output ports to be used in link aggregation (LAG).

9. A method, comprising:
- in a network element, assigning multiple output ports corresponding to respective different paths via a communication network for routing packets to a given destination-address group;
- holding, for the given destination-address group, respective state information for each of multiple sets of hash results, wherein the state information comprises at least an output port that routes packets to the given destination-address group and respective timeout information;
- receiving via an input port a packet destined to the given destination-address group;
- calculating a given hash result for the packet and identifying a set of hash results in which the given hash result falls;
- selecting an output port from among the multiple output ports that were assigned to the given destination-address group, based on the state information corresponding to the identified given set of hash results; and
- forwarding the packet to the given destination-address group via the selected output port.

10. The method according to claim 9, wherein holding the state information comprises holding the state information per set of hash results in multiple hash tables that correspond to multiple respective destination-address groups, and wherein selecting the output port comprises identifying the given destination-address group to which the packet is destined, selecting a hash table corresponding to the given destination-address group, and retrieving the state information from the selected hash table.

11. The method according to claim 10, wherein holding the state information comprises holding a mapping between the destination-address groups and the respective hash tables, and wherein selecting the output port comprises selecting the hash table by matching a destination address of the packet to the given destination-address group and choosing the hash table based on the given destination-address group using the mapping.

12. The method according to claim 11, wherein matching the destination address comprises identifying that the destination address belongs to the given destination-address group.

13. The method according to claim 9, wherein assigning the multiple output ports comprises assigning the multiple output ports to be used in equal-cost multi-path (ECMP) routing.

14. The method according to claim 9, wherein assigning the multiple output ports comprises assigning the multiple output ports to be used in adaptive routing (AR).

15. The method according to claim 9, wherein assigning the multiple output ports comprises assigning the multiple output ports to be used in the Open Flow protocol.

16. The method according to claim 9, wherein assigning the multiple output ports comprises assigning the multiple output ports to be used in link aggregation (LAG).

17. The network element according to claim 1, wherein the circuitry is configured to receive via respective input ports first and second packets whose respective hash results fall in the given set of hash results, and to select for the first and second packets different respective output ports when the first and second packets are destined to different respective destination-address groups.

18. The method according to claim 9, and comprising receiving via respective input ports first and second packets whose respective hash results fall in the given set of hash results, and selecting for the first and second packets different respective output ports when the first and second packets are destined to different respective destination-address groups.

* * * * *